United States Patent [19]

Welsh

[11] Patent Number: 5,374,951
[45] Date of Patent: Dec. 20, 1994

[54] METHOD AND SYSTEM FOR MONITORING TELEVISION VIEWING

[75] Inventor: Russell J. Welsh, Toronto, Canada

[73] Assignee: PEACH Media Research, Inc., Toronto, Canada

[21] Appl. No.: 89,672

[22] Filed: Jul. 8, 1993

Related U.S. Application Data

[63] Continuation of Ser. No. 532,030, Jun. 1, 1990, abandoned.

[51] Int. Cl.5 .............................................. H04N 7/10
[52] U.S. Cl. ........................................... 348/4; 455/2; 455/6.3; 379/92
[58] Field of Search .................. 455/2, 3.1, 4.1, 4.2, 455/5.1, 6.1, 6.2, 6.3; 380/10; 358/84, 85, 86; 348/4, 12; 379/92

[56] References Cited

U.S. PATENT DOCUMENTS

| 4,677,466 | 6/1987 | Lert et al. | 455/2 |
| 4,697,209 | 9/1987 | Kiewit et al. | 358/84 |
| 4,739,398 | 4/1988 | Thomas et al. | 455/2 |
| 4,857,999 | 8/1989 | Welsh | 358/84 |
| 4,888,638 | 12/1989 | Bohn | 455/2 |
| 5,019,899 | 5/1991 | Boles et al. | 455/2 |

Primary Examiner—Reinhard J. Eisenzopf
Assistant Examiner—Andrew Faile
Attorney, Agent, or Firm—Faegre & Benson

[57] ABSTRACT

A system for monitoring and recording as data television program viewing habits utilizing a plurality of remote program monitor units in panelists households and automatically periodically reporting such data to a central computer via a conventional telephone network.

18 Claims, 11 Drawing Sheets

METHOD AND SYSTEM FOR MONITORING TELEVISION VIEWING

This is a continuation of copending application Ser. No. 07/532,030 filed on Jun. 1, 1990, now abandoned.

BACKGROUND OF THE INVENTION

This invention relates generally to an improved method and apparatus for identifying television broadcast programs as they are received by a television receiver in the household. This invention is particularly useful in the field of test marketing but is not limited thereto. Test marketing allows businesses to test and experiment with a marketing strategy in a limited geographic area before committing to a full launch of the proposed marketing plan. Test markets are usually conducted by monitoring the behavior of a panel of households in a limited geographical area. Very precise demographic information is maintained on the households in the panel. The research generally consists of monitoring the behavior of a panel of households both before and after one or more variables in the environment have been changed. The research also consists of correlating the panelists' behavior with exposure to television commercials and other forms of advertisement. An example of one type of relationship that is of particular interest to the researcher is the relationship between the purchasing behavior of panelists and viewing of television commercials by panelists. Two types of data are required to study this relationship. First is the data related to the panelists' behavior, such as their purchasing patterns of products or services. The second type of data that is monitored is the number of exposures to a particular commercial or advertisement that the panelists receive. Sometimes the researcher monitors two or more panels of households at the same time. This technique permits inter group comparisons to be made as each group is exposed to either different types of commercials or advertisements and/or different amounts of exposure to these stimuli. The groups may be referred to as the control group and the test group.

DESCRIPTION OF THE PRIOR ART

Collection of the data relating to the products purchased by the cooperating panelists can be done by one of several well known methods, some of which are described in some of the prior art. One such method utilized in the past has been to have the cooperating panelists manually maintain a diary of their purchases. Another method as described in U.S. Pat. No. 4,331,973 issued May 25, 1982 to Eskin et al. for a Panelist Response Scanning System requires the cooperation of retailers in the test area. Panelists who present their unique identification card to the cashier at the point of purchase will automatically have their purchases recorded. The purchases are recorded in stores where universal product code automated check-outs are available and the collected information is retained in the store's computer and transferred to the market research firm's database at a convenient time. Another system as set forth in U.S. Pat. No. 4,658,290 issued on Apr. 14, 1987, to McKenna et al. permits the panelists to record their purchases in the house through the use of a universal product code reader. The information collected can be stored in a collection unit in the house and subsequently transferred to a central location.

Several different methods exist, when conducting a test market in a limited geographic area, to select those households that will be exposed to a special television signal and to monitor the number of exposures to the signal. To expose only those selected panelists to the special television signal, such as a commercial, the signal is inserted into regular programming and transmitted to selected households.

An old technique used in test marketing is described in U.S. Pat. No. 3,366,731, issued Jan. 30, 1968 to Edward Wallerstein for Television Distribution System Permitting Program Substitution for Selected Viewers. In this system two cables originating from the same source go out to different groups of households. With this system configuration different advertisements can be inserted on each cable and transmitted to the different groups. A shortcoming of this system is that there is no automatic recording of the event when the television is tuned to a channel on which an advertisement has been sent out. To get an estimate of the panelists exposure to the substituted commercial the researcher must rely on program ratings and audience projections for the program during which the substitute commercial was transmitted.

Another approach to market research is illustrated in U.S. Pat. No. 3,639,686, issued Feb. 1, 1972 to Harold R. Walker and Ira Kamen for Television Receiver Cut-In Device. In this system an auxiliary television signal is broadcast throughout a broadcast area with a particular control signal identifying the class of viewers that is to be reached by the auxiliary television signal. This system uses special decoders which tune to the special signal under certain conditions when the receiver receives a particular address signal identifying the respective receivers as being in the class to which the signal is to be transmitted. A limitation of the system is that it does not record the event as to whether or not the special television signal was displayed on the television.

An improvement on the previous two systems is illustrated in U.S. Pat. No. 4,331,974, issued May 25, 1982 to Cogswell et al. for Cable Television With Controlled Signal Substitution and U.S. Pat. No. 4,331,973, issued May 25, 1982 to Eskin et al. These patents describe a dynamic cut in device, so called because the household panels may be individually selected for each market test conducted by the researchers. A major problem with these sophisticated methods is that at least one additional channel is required to transmit the substitute television signal. With the proliferation of new cable channels, spare channels are scarce, difficult to obtain and therefore expensive. The necessity for this extra channel in some of the prior art increases the total cost of conducting the test market as the extra channel has to be leased from the cable operator. Another problem is that although the system does record when a panelist television receiver is turned on and the channel selected by the respective viewer, this vast quantity of information must be mapped onto a master schedule or some other similar procedure must be performed to determine if the substitute program was displayed on the panelist's television receiver.

Yet another system is described in U.S. Pat. No. 4,658,290 issued to McKenna et al. describes a household data gathering system that utilizes a simplex receiver which permits dynamic allocation so that television signal substitution may be performed. Similar to most of the other systems described, this one also requires the alternate signal to be transmitted from the cable head end and down channels normally not used for entertainment.

SUMMARY OF THE INVENTION

One object of the present invention is to provide a novel automatic method and apparatus for identifying broadcast television programs and commercials as they are viewed by selected households.

Another object of the present invention is to provide an improved in-house commercial monitoring system so that when it is combined with a split cable system and any of the known techniques for collecting product purchase data, it provides a new and improved cost efficient means of conducting test marketing.

Another object of the present invention is to provide an improved method of commercial monitoring that may be incorporated into any of the known methods of signal substitution and reduce the amount of data that previously needed to be collected.

These and other objects are achieved by monitoring in the panelist's household the programs and commercials on the channel to which the viewer is tuned. One method of monitoring using a central computer system is described in U.S. Pat. No. 4,857,999 issued Aug. 15, 1989, for a Video Monitoring System and assigned to the assignee of the present invention.

The method of the present invention similarly monitors line 21 of field 1 of the television signal to extract strings of characters. These character strings are compared to a library of preselected character strings which are stored in a memory located in a remote panelist's household unit after having been transmitted from a central location to the unit via the non-dedicated telephone line. If a match of character strings is obtained, the occurrence of the event and the time it occurred are logged in the unit's memory. This data may be transmitted at an appropriate time to a central location via a non-dedicated telephone line.

The present invention is superior to the existing techniques used in panelists households as it will be able to identify a plurality of predetermined commercials as they are viewed in the house and record the occurrence of such events. This is an improvement over the prior art as it eliminates the need to monitor the channels and times at which the commercials were broadcast on the cable so that the commercials viewed by panelists can be determined from the television set tuning data that is collected in the house. A further improvement over the prior art is that the present invention reduces the amount of information that must be stored by the monitoring unit located in the panelist's house. This improvement is of particular use but not limited to an area of research known as "share of voice." In this type of research the advertiser is interested in comparing the number of exposures a panelist has received of a particular advertisement relative to exposures to other advertisements for similar products or services. The present invention is appropriate for this task as it can record when and which one of a plurality of preselected advertisements was viewed by the panelist. Unlike the prior art the present invention can record the occurrence of preselected events and there is no need for the researcher to monitor all channels to identify on what channel and at what time one of the commercials of interest occurred. This was necessary in prior art systems which only record whether the television receiver was on and to what channel it was tuned.

BRIEF DESCRIPTION OF THE DRAWINGS

FIG. 4b is the continuation of FIG. 4a.

DETAILED DESCRIPTION

Figure 1:
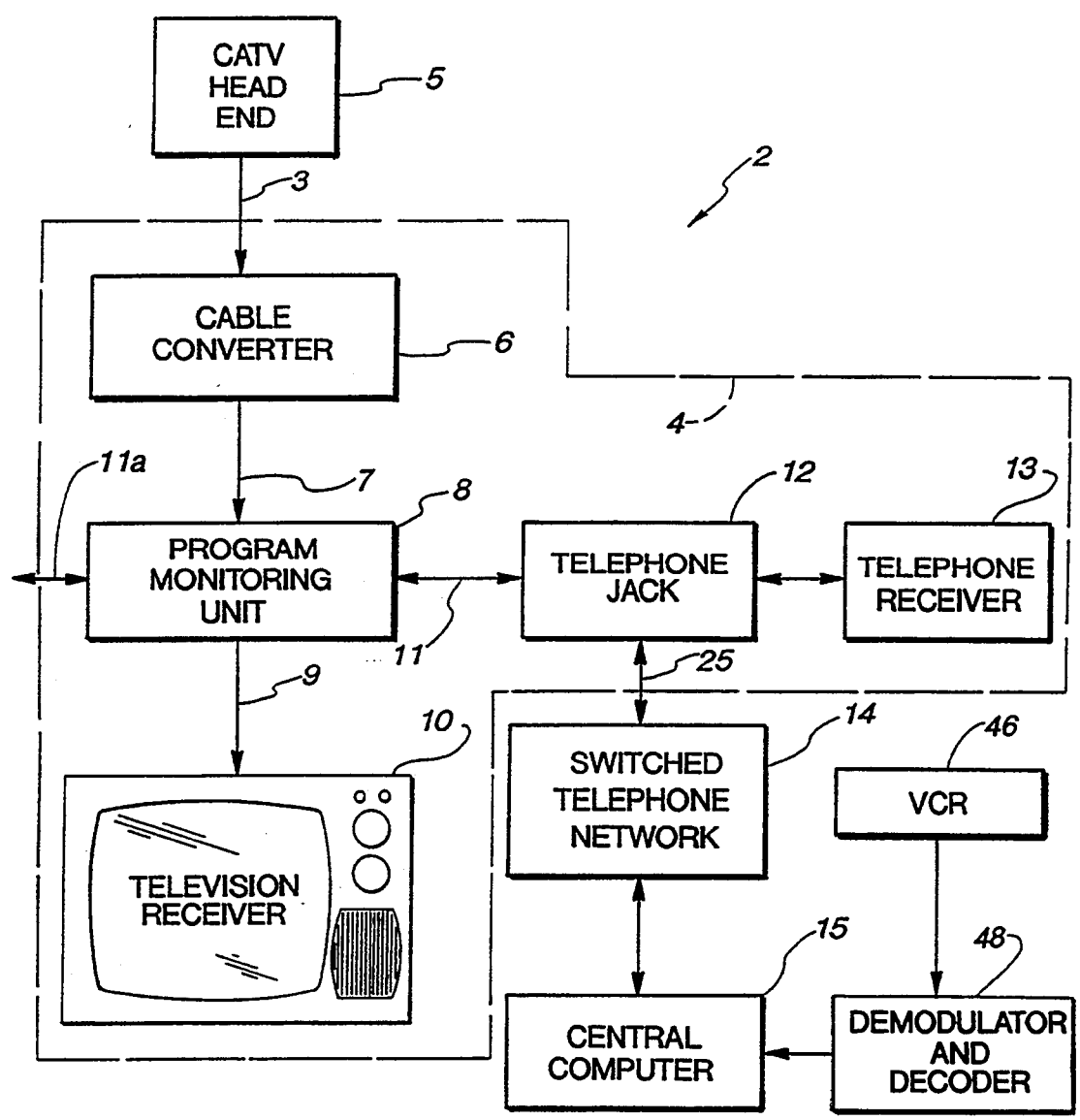
FIG. 1 is a block diagram of the system.

FIG. 1 shows a block diagram illustrating a program monitoring unit 8 interconnected with other components in a cable television based test market system 2 which includes commercial substitution. Preferably, a plurality of units 8 are provided, appropriately located in the houses of panelists or the like who have agreed to participate in the panel. The television signal emanates from a cable television head end 5 and is transmitted to a subscriber via a conventional transmission line 3. The signal is directed to a cable converter 6 which is used by the householder to select the television channel that is to be viewed on a television receiver or set 10. The output 7 of the cable converter 6 is normally fixed on one VHF television channel such as channel three. Output 7 of the cable converter 6 is connected to the program monitoring unit 8 where signal processing and data collection functions are performed, as explained in more detail later. The channel three signal on line 7 is preferably passed through the program monitoring unit 8 so that it can be viewed on the panelist's television set 10 via line 9. A second output path or telephone line 11 from the program monitoring unit 8 is connected to a conventional telephone jack 12 through which outgoing and incoming telephone calls are linked to the panelist's house with appropriate wiring and the like interconnecting telephone receivers 13 in the panelist's house with a conventional switched telephone network 14. A household telephone line 25 is used to provide a communication channel from the program monitoring unit 8 through network 14 to a central computer 15. Boundary 4 encloses those elements of system 2 in a particular household and indicates elements to be replicated for multi-household applications.

Figure 2:
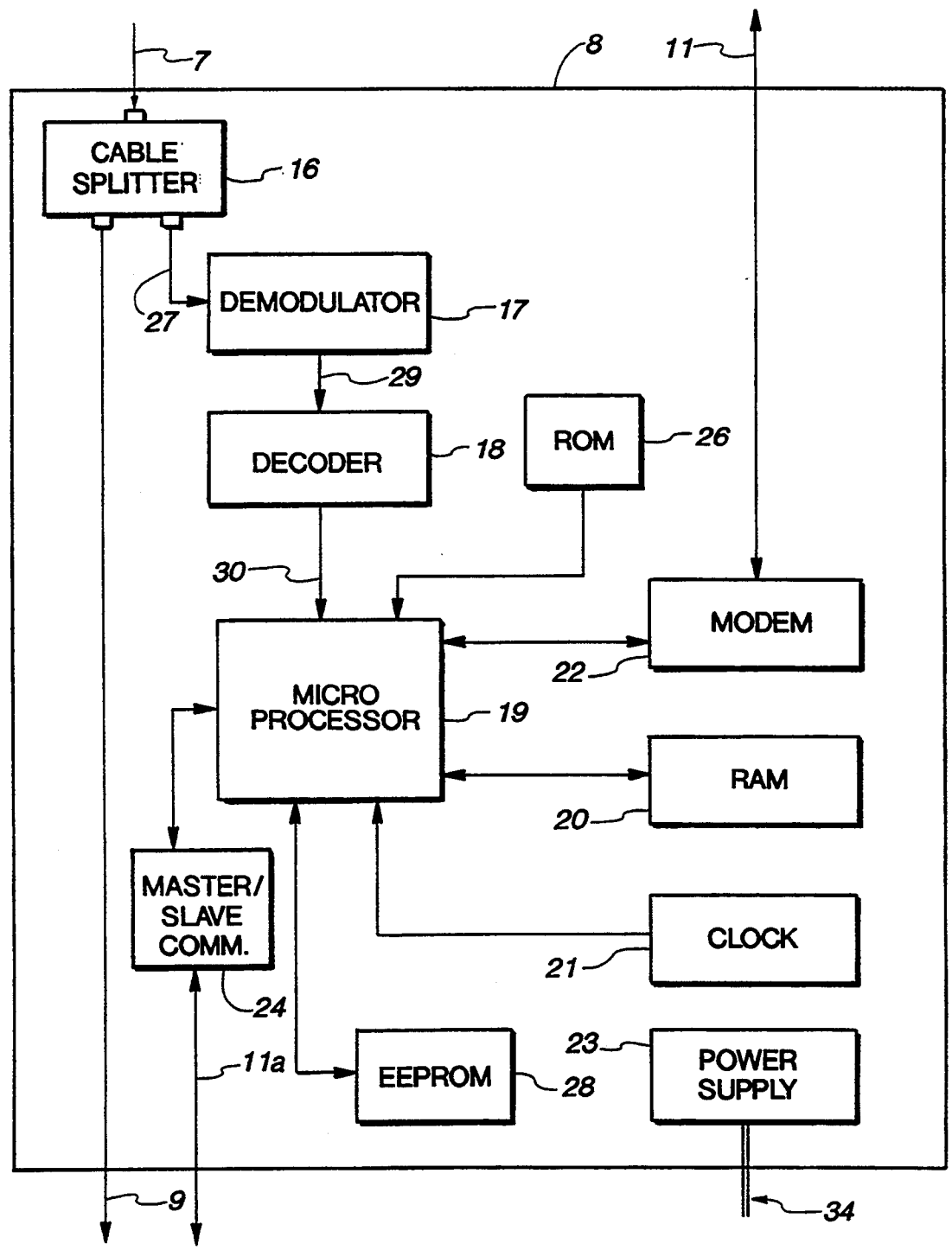
FIG. 2 is a block diagram of the Program Monitoring Unit (PMU).

Referring also now to FIG. 2, the program monitoring unit or PMU 8 contains a character string table stored in a memory 20. Each entry in this table consists of a character string and a shorter unique program indentification code. The program monitoring unit 8 processes the television signal on line 7 to extract character strings that are embedded in the the television signal and then searches the character string table for a match.

When the program monitoring unit is first installed in a household, the table is initialized with the character strings and program identification codes for the commercials that it will search for. Whenever the program monitoring unit communicates with the central site, the contents of this table can be changed.

In accordance with this embodiment, memory 20 also store data as to which commercials have been viewed by the panelist. Periodically the program monitoring unit 8 will use the household telephone line 25 to "dial-up" the central computer 15. On establishing appropriate telephone communications with the panelist's program monitoring unit 8, the stored data is transmitted via the public switched telephone network 14 to the central computer 15. In addition to extracting data from the program monitoring unit 8 while the telephone communication is active, the central computer 15 may also download instructions and data to the program monitoring unit 8 via the telephone line 25.

The main components of the program monitoring unit (PMU) 8 preferably includes an 8-bit microprocessor 19, ROM (read only memory) 26, an EEPROM (electrically erasable programmable read only memory) 28, a demodulator 17, a decoder 18 and a power supply 23. The power supply 23 provides the required power for various components to function properly, and is connected through a transformer (not shown) to the household's regular AC power source through lines 34. Since each PMU 8 is unique to a particular house it contains an EEPROM 28 which is a non-volatile memory that is used to store parameters that are specific to the household. The information programmed into the EEPROM 28 includes a unique household identification number and the telephone numbers for the PMU 8 to use to "dial-up" the central computer 15.

The PMU also contains a signal splitter 16 to which the signal from the household's cable converter 6 is directed. There are two output paths from the splitter 16; the first path 9 goes directly to the television receiver 10 in the household so that the viewer watches the television channel that was originally selected on the cable converter 6. Unlike some previous systems the present invention utilizes a conventional cable converter 6 that is normally found in households. The second output 27 of the splitter 16 is directed to demodulator 17. The demodulated signal on line 29 is then sent to the decoder 18. Decoder 18 produces the character strings that are encoded in the television signal. A preferred method used to decode the character string from the demodulated television signal is described in U.S. Pat. No. 4,857,999.

The character string is directed to the microprocessor 19 via path 30. Microprocessor 19 compares this character string to strings contained in a character string table in the random access memory (RAM) 20. If a match of character strings is detected, the present time on a system clock 41 and a program identification code for the commercial are stored in an event log in the RAM 20. If no match is found the system ignores the decoded character string and no new data is stored in the event log. Each time a character string is produced by the decoder 18, the previously described comparison procedure takes place.

PMU 8 also preferably includes a modem 22 by which it communicates with the central computer 15 via the regular telephone lines 25. Each PMU 8 is assigned a time at which it uses the household telephone line to establish a connection with the central computer 15. During a communication session with the PMU 8, the central computer 15 may recover any data that has been collected by the PMU 8 and may update the character string table in RAM 20.

The central computer 15 recovers the contents of the event log from a PMU 8 during a communication session. Each event recovered from a household PMU 8 includes the program identification code and corresponding date and time values. The central computer 15 maintains a database that includes household identification numbers and the program identification numbers for each commercial that each household viewed along with the corresponding date and time at which that respective commercial was viewed.

The description of system 2 to this point has described a situation in which only one television set is monitored in a household. However, it is to be understood that the system can easily be expanded to deal with households with more than one television set. In such event, each additional television set is equipped with a program monitoring unit 8. At installation time, the EEPROM 28 in each unit would be programmed with a television set identification number unique to that household as well as the household identification number. During a communication session with each unit 8, the central computer would recover the household and television set identification numbers as well as the contents of the data event logs.

An alternative method of handling multi-set houses uses one master unit to handle all communications with the central computer 15 and slave units to handle the data collection at each television set and which are able to communicate with the master unit.

To provide for this feature the PMU has a Master/Slave Communication block 24 to facilitate the connection of the master unit to a plurality of slave units.

Figure 1A:
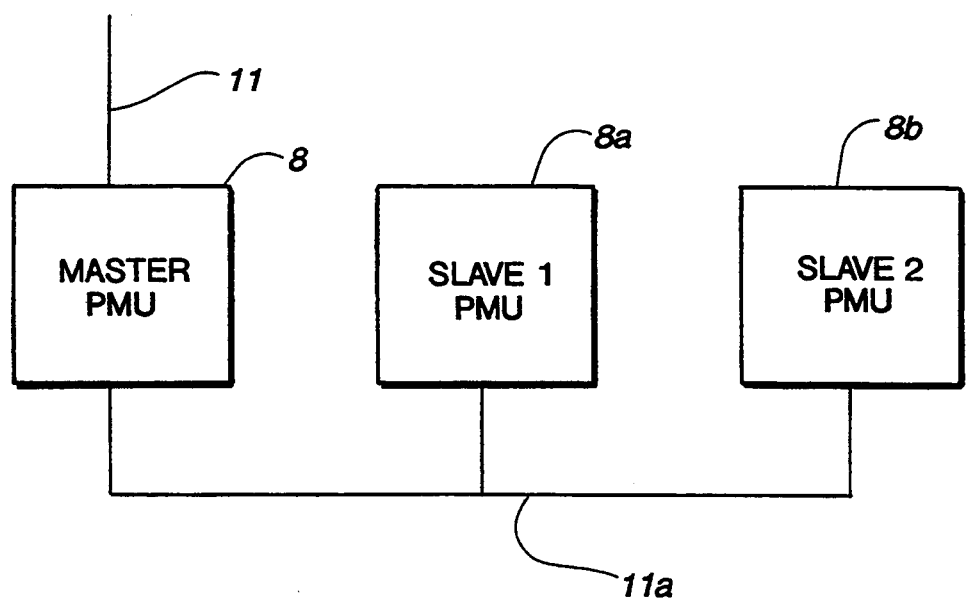
FIG. 1a is a block diagram of a master-slave PMU subsystem.

FIG. 1a shows a block diagram of a master PMU 8 connected to two slave PMUs 8a and 8b. Each slave PMU 8a, b is basically the same as the master PMU 8, the only difference being that the slave PMUs 8a,b need not contain a modem to facilitate communication with the central computer 15 via the telephone line 11. The slave PMUs 8a, b communicate with the central computer 15 through line 11a to the master PMU 8 and then through the telephone line 11 connected to the modem 22 in the master PMU 8. The master and slave units 8–8a,b preferably communicate over dedicated wiring 11a in the panelist's household that is installed at the same time as the PUMs 8–8a,b. Whenever the central computer communicates with the household it does so through the master PMU 8. Any information sent to the master PMU 8 to update the character string table is automatically forwarded from the master unit 8 to the slave units 8a,b. Periodically the master unit 8 interrogates each of the slave units to collect any event log data that is present. The data from each of the slave units 8a, b is maintained in separate memory areas in the master unit RAM 20. When the central computer 15 communicates with the master unit 8 it will collect the data event logs of the slave units 8a,b along with the event log of the master unit 8.

The description to this point has described a system 2 in which the remote PMU 8 in the household has searched for specific character strings, each associated with a specific television commercial. However, in a more general application, the system could be used to identify all the commercials or all the programs including commercials that are viewed in the household. In this case, the PMU 8 would store all the character strings that were decoded from the received television signal. These character strings would be returned to the central computer 15 during a normal communication session. The central computer would then assign the appropriate program identification codes.

Figure 2A:
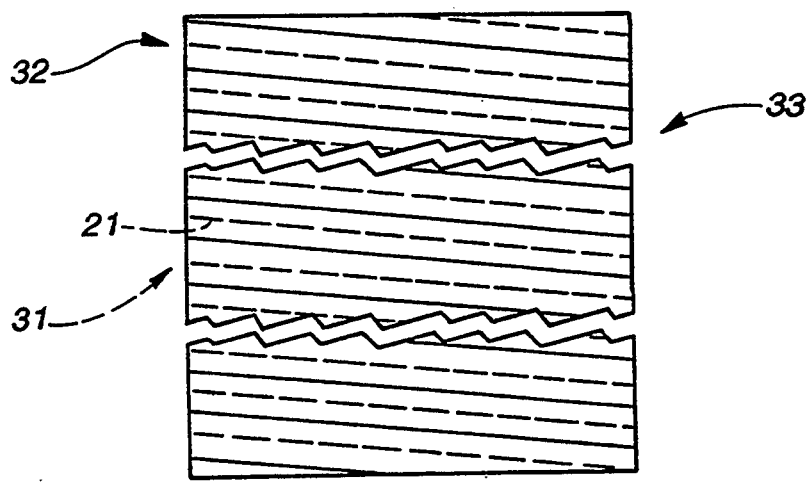
FIG. 2a is a diagram showing a view of fields 31, 32 of frame 3.
Figure 2B:
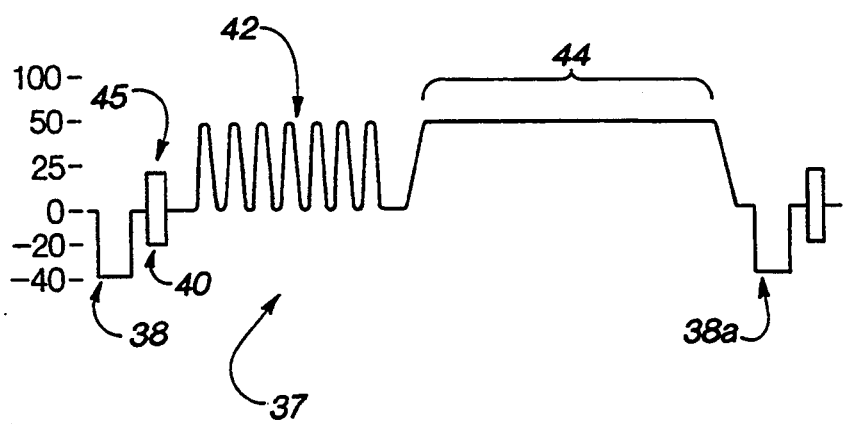
FIG. 2b shows the waveform of line 21, field 31 of the NTSC television signal.

Before proceeding with the description, some background on the closed captioning signal is required. The reader is directed to the referenced PBS Report No. E-7709-C for a complete specification of the closed captioning signal. The NTSC television signal is comprised of 30 picture frames per second with 525 scan lines per frame. Referring now to FIG. 2a, first and second fields 31, 32 of a frame 33 may be seen. Scan line 21 in field 31 of frame 33 is reserved for the closed captioning signal as described in the FCC Rules and Regulations Title 47, Part 73, Section 682. The waveform of this signal 37 is shown in FIG. 2b as depicted in the FCC Rules and Regulations Title 47, Part 73, Section 699 which is hereby expressly incorporated by reference herein. As depicted in FIG. 2b, line 21 consists of a horizontal sync pulse 38, followed by the color burst 40, followed by 7 cycles of clock run-in 42 and then a two-character wide data window 44 for closed captioning information. Data may be transmitted in the window as a pair of characters every 33.3 milliseconds. The maximum data rate is 60 characters per second.

The purpose of the decoder 18 is to process the composite video signal and extract the data in the window 44 which may include up to two characters of closed captioning information from each occurrence of line 21. This module contains two sections—the first extracts line 21 signal or waveform 37 from field 31 of each frame 33 of the composite video signal and the second extracts character data from each occurrence of line 21 if characters are present in data window 44.

Figure 3A:
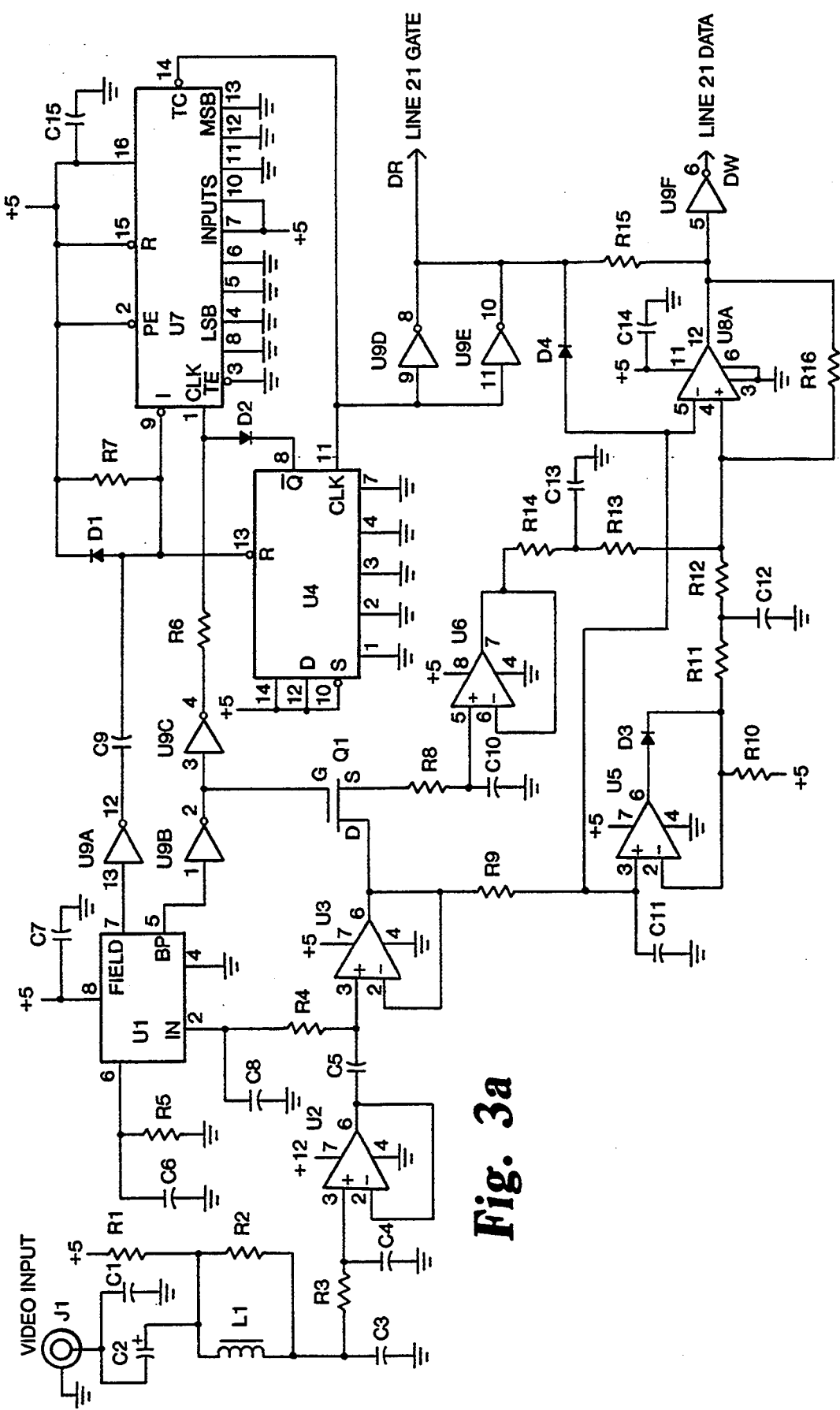
FIGS. 3a and 3b comprise a circuit diagram for the decoder shown as a block in FIG. 2.
Figure 3B:
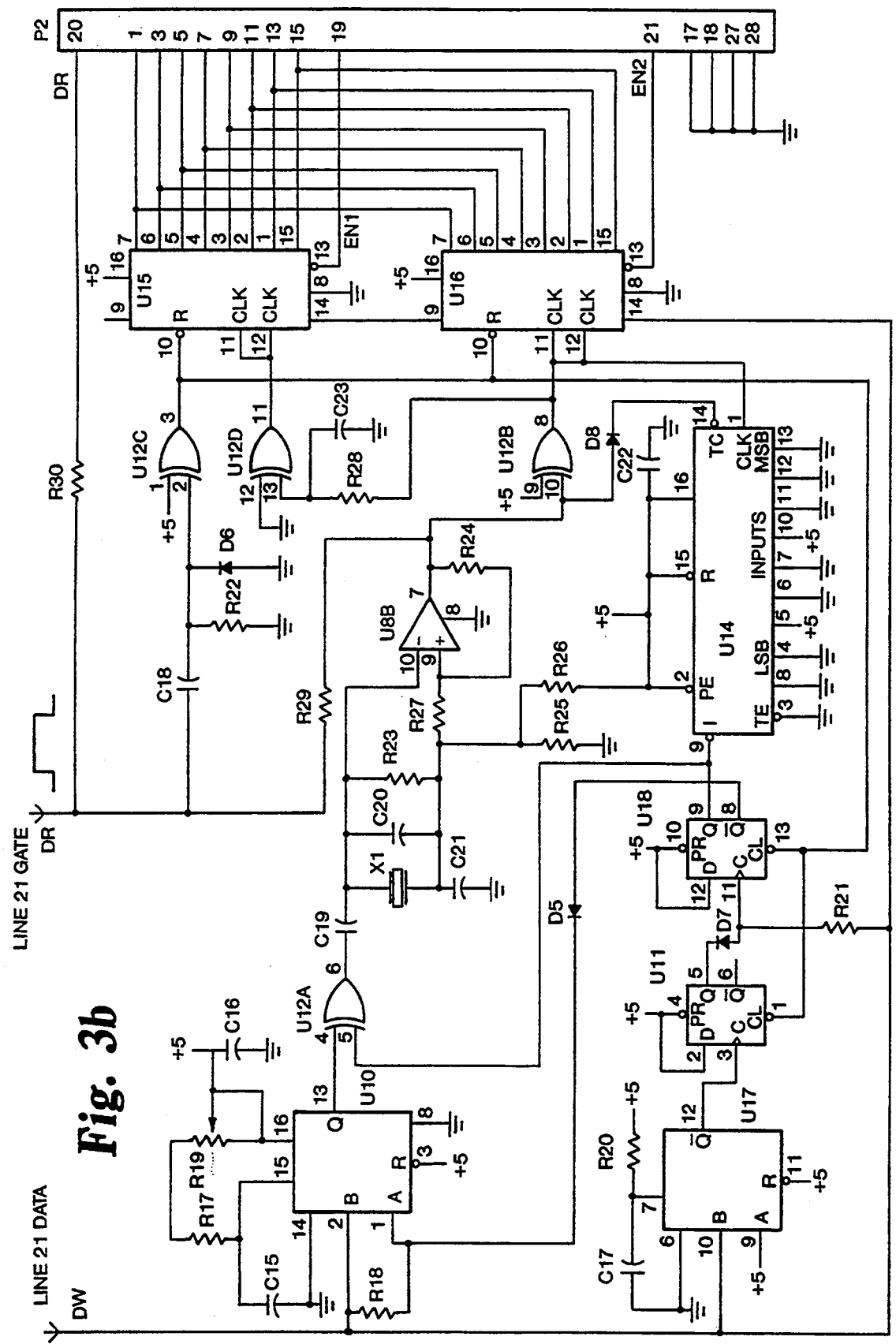

The circuitry of the signal processing module 48 is shown in FIGS. 3a and 3b. FIG. 3a shows the circuit that extracts signal 37 from line 21, field 31 of frame 33 and FIG. 3b shows the circuit that extracts characters from data window 44 of signal 37.

The function of the circuitry shown in FIG. 3a is to process the composite NTSC television signal, separate the line 21 signal 37 from the complete NTSC signal and convert it into two digital signals, DR and DW. Signal DR is a line 21 gate signal and signal DW is a line 21 data signal.

The video is input at the connector J1. The video signal passes across a 1.8 nf capacitor C1 and through a 22 uF capacitor C2 to a 45 microhenry inductor L1 in a resistive ladder network having a 100K resistor R1 and a 1K resistor R2. The signal is then passed across a 3.3 nF capacitor C3 and through a 1K resistor R3 to a 100 pF capacitor C4 and into the non-inverting input pin 3 of a type SE5534 operational amplifier U2, available from Signetics. Amplifier U2 is connected in a unity gain non-inverting configuration having an output at pin 6 feeding a 0.1 uF capacitor C5 which passes the AC component of this signal to the non-inverting input of another type SE5534 operational amplifier U3, also connected as a unity gain non-inverting follower. Output pin 6 of U3 is connected to the drain D of a 2N7000 FET transistor Q1. The signal at pin 3 of U3 is also connected through a 470 ohm resistor R4, across a 1.8 nF capacitor C8 and into pin 2 of an LM1881 type integrated circuit, available from National Semiconductor. U1 is used as a sync separator to identify the start of a new field. U1 has field index and back porch gate outputs at pins 7 and 5, respectively. U1 further has a 0.1 uF capacitor C6 and a 470K resistor R5 connected to pin 6. U1 still further has a 0.1 uF noise suppression capacitor C7 connected to its power supply input pin 8. The FIELD output of U1 at pin 7 is connected to a digital logic inverter U9A, which is preferably formed from a type 74HC04 hex inverter. The output of inverter U9A is passed through a 330 pF capacitor C9 to input pin 9 of U7, which is a HC40103 type integrated circuit counter available from Signetics. Diode D1, along with all other diodes in FIGS. 3a and 3b may be a 1N4148 type. Output pin 5 from U1 is connected to the input of another inverter U9B. Output pin 2 of inverter U9B is connected to the gate G of Q1 and input pin 3 of inverter U9C. Output pin 4 of inverter U9C is connected through a 2K2 resistor R6 to the clock input pin 1 of U7 and through a diode D2 to the not Q output pin 8 of U4. U4 is preferably a type HC74 integrated circuit available from Signetics. A 3K3 resistor R7 is connected from the power supply to the input pin 9 of U7.

The source S of Q1 is connected through a 1K resistor R8 to the non-inverting input pin 5 of a type LM358 integrated circuit operational amplifier, available from National Semiconductor. A 0.1 uF capacitor C10 is connected between the non-inverting input pin 5 and circuit common. The output pin 7 of U6 is connected through a resistive network of a 470 ohm resistor R14 and a 12K resistor R13 shunted by a 0.1 uF capacitor C13 and passing to the non-inverting input pin 4 of U8A, which is preferably a type LM319 voltage comparator. Output pin 6 of U3 is also connected through a 1K resistor R9 and across a 100 pF capacitor C11 to the non-inverting input pin 3 of U5, which is preferably a LM6361 type operational amplifier. The output pin 6 of U5 is connected through a diode D3 through a resistive network of a 150K resistor R10, a 51 ohm resistor R11, and a 10K resistor R12, connected to the non-inverting input pin 4 of USA. A 1.8 nF capacitor C12 is connected between resistors R11 and R12.

Positive feedback for U8A is provided by a 560K ohm resistor R16, while diode D4 and a 470 ohm resistor R15 are connected in the output pull-up path of U8A. A pair of inverters U9D and U9E formed from the hex inverter U9 are connected in parallel to drive output DR from the TC output of U7 at pin 14. The output of U8A is connected to a digital logic inverter U9F to provide output signal DW. U1 can accurately identify the start of a new field and has field index and back porch gate outputs. Signal DW is a bit stream of the clock run-in pulses 22 and the data bits in window 24. Signal DR is active (high) only when line 21 in field 1 is being processed.

The operation of this portion of the circuit is as follows. Signal DR is normally low and goes high only when NTSC line 21 is present. Signal DW goes active only during NTSC line 21. Line 21 is identified by U1, U4 and U7. U1 accepts the composite video signal as input on pin 2 and produces output signals at pins 7 and 5. The FIELD signal at pin 7 of U1 is high (+5 volts) when NTSC field 1 is being received and low (0 volts) when NTSC field 2 is being received. The BP signal from pin 5 of U1 is a 4.8 usec pulse that occurs in the middle of the back porch 4S following the horizontal sync pulse 38. Counter U7 is initialized by the FIELD signal at the beginning of field 1 and is counted down by the pulses from BP. When line 21 is reached, pin 14 on U7 goes low for one scan line, thus creating the line 21 gate signal DR. The next pulse on BP causes pin 14 on U7 to return to the high state which sets the flip flop U4 and terminates counting by U7 until the next frame. The signal pulse BP is also used to sample the video signal to create a black reference level. When BP is active, it turns on Q1, allowing the black level of the back porch 25 to be sampled and stored on capacitor C10. The peak value of the video of line 21 is stored on capacitor C12. The voltage difference between the voltages stored on C10 and C12 is divided by the resistors R13 and R12 to create a reference level that is about half way between the two levels. This reference level is applied to pin 4 of U8A and the composite video signal is applied to pin 5 of U8A. U8A is a high speed comparator which, as a result of comparing the composite video signal to the reference level will provide a digital logic signal at pin 12. This signal is inverted by U9F to produce signal DW. Signal DW is normally clamped high, but during line 21 when DR goes high, signal DW is released and carries a digital logic waveform consisting of a digital representation of clock run in pulses 42 and data bits of window 44 in line 21.

Referring now to FIG. 3b, signals DW and DR are processed to extract two characters for each occurrence of line 21, field 31, containing closed captioned characters. Signal DW is delivered to the B input of each of U10 and U17, which are preferably a one shot or monostable multivibrator circuit type HC123, available from Signetics. U10 has a 3K3 resistor R18, a 330 pF capacitor C15, a 3K3 resistor R17 and a 5K potentiometer R19 (used to set the width of the pulse on pin 13 of U10), in addition to a 0.1 uF capacitor C16. U17 has a 4K resistor R20 and a 1 nF capacitor C17. U11 and U18 are preferably formed of a 74HC74 D-type flip flop available from Signetics. Diode D7 is connected to the DW signal line through a 3K3 resistor R21. Diode D5 is connected between pin 1 of U10 and pin 8 of U18. Gate U12A is preferably formed of a 74HC86 type integrated circuit available from Signetics and couples the Q output at pin 13 of U10 through a 33 pF capacitor C19 to a 503.5 kilohertz resonator X1 which may be a model 503B as manufactured by Murata. Resonator X1 connects to a 0.1 uF capacitor C21 and a network formed of a 220 pF capacitor C20, a 100K resistor R23, a 1K resistor R27 and 10K resistors R25 and R26 to provide a cleaned-up clock signal from pin 13 of U10 to both inputs of U8B, which is preferably a type LM319 voltage comparator with a 100K positive feedback resistor R24.

The DR signal passes through a 1K resistor R29 and enables the output of U8B at pin 7 and fed to one input of U12B which is an inverter formed of a 74HC86 integrated circuit. U14 is preferably a type HC40103 integrated circuit counter available from Signetics, and connected to operate as a divide-by-16 counter. Counter U14 has a 0.1 uF capacitor C22. Diode D8 couples the TC output from U14 pin 14 to pin 10 of U12B. The output of U12B at pin 8 is connected to the CLK inputs of U16, which is preferably a type HC595N 8-bit shift register, available from Texas Instruments.

Signal DR is also coupled through a 330 pF capacitor C18, to diode D6 and into an input of U12C. The output of U12C at pin 3 is connected to the R input (the reset input) at pin 10 of U15 and U16 which are both a type HC595N 8-bit shift registers. Signal DR is provided to connector P2 through a 470 ohm resistor R30. The outputs of U15 and U16 are connected to connector P2.

Output enable signal lines EN1 and EN2 are similarly connected to connector P2.

The function of the circuitry shown in FIG. 3b is to process the signals DW and DR to load the serial bits of the two characters into a register which can be accessed by a parallel read operation. Signal DW is active only during NTSC line 21. When it is active it is a digital logic waveform consisting of the 7 cycles of the clock run-in followed by one start bit and two 8 bit data characters. The rising edges of the clock run-in pulses trigger two one shots U10 and U17. The function of the one shot circuit U10 is to derive a normalized clock signal. The normalized clock signal from pin 13 on U10 is used to energize the resonator X1 which is tuned to the clock run-in signal frequency of 503.5 KHz. The resonator X1 signal is squared up by the comparator U8B. Referring also to FIG. 2, the period of the clock run-in signal is 1.98 usec per cycle and the seven cycles are followed by 3.972 usec of low signal level. The one shot formed by U17 is retriggerable and times out after the end of the clock run-in pulses 42, resulting in the setting of the flip flop U11. Setting U11 unclamps the clock input on U18. The next data rising edge will be the start bit which will then set flip flop U18. U18 then releases the counter U14 and the shift registers U15 and U16. The counter U14 is initialized with a value of 16 and is driven by the clock from the resonator X1. The 16 data bits are subsequently clocked into the shift registers. When the counter hits zero, the signal on pin 14 of U14 goes low which terminates the clock signal to the shift registers U15, U16. After NTSC line 21, signal DR goes low. Signal DR and the contents of the shift registers U15 and U16 are available to the microprocessor 19. A high-to-low transition of DR can be used an an indication that the data is available in the shift registers U15, U16.

Figure 4:
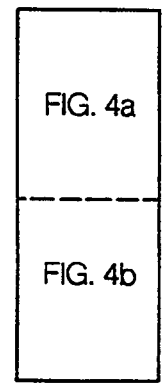
FIG. 4 is a key diagram for FIGS. 4a and 4b.
Figure 4A:
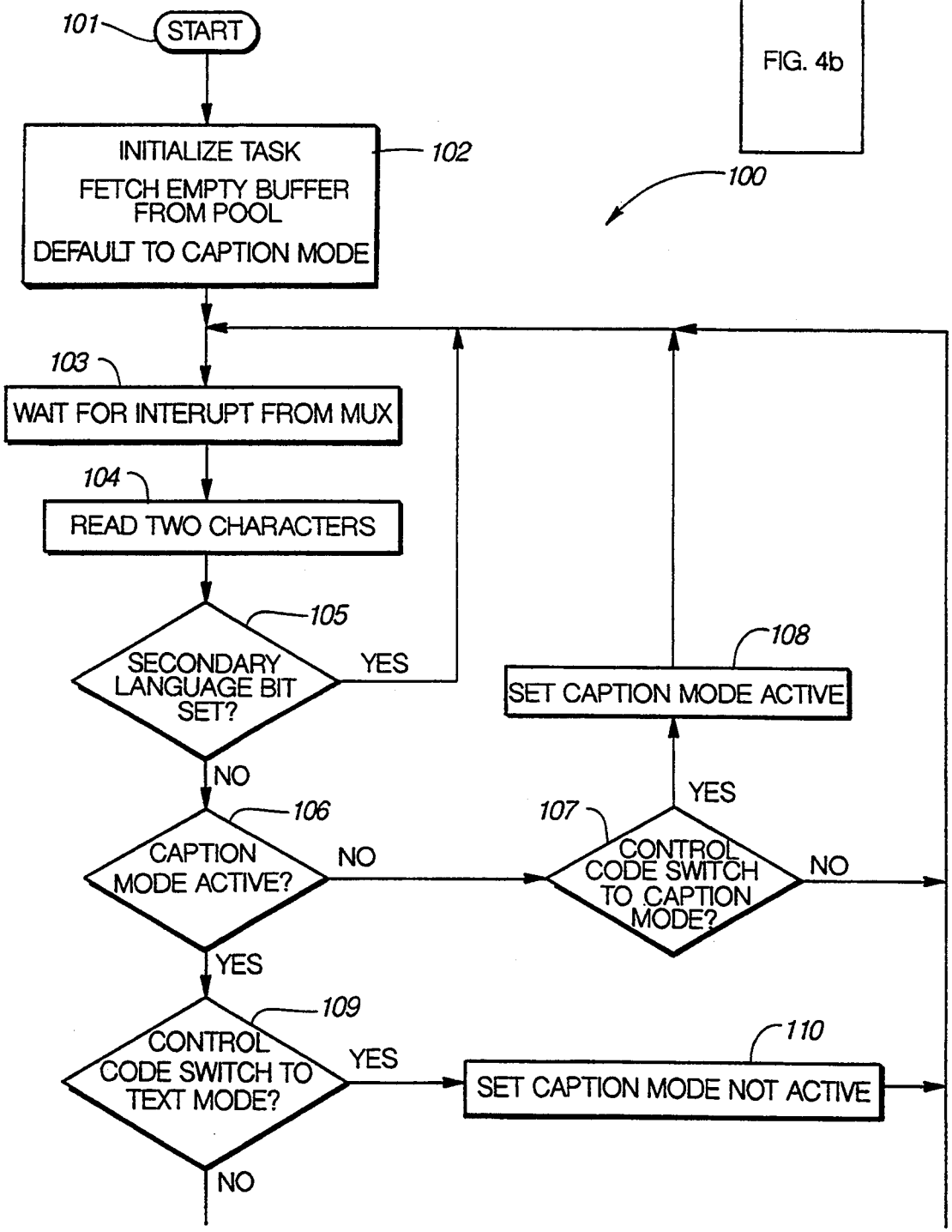
FIG. 4a is a partial flow chart for the software that assembles a paragraph of closed captioning data.
Figure 4B:
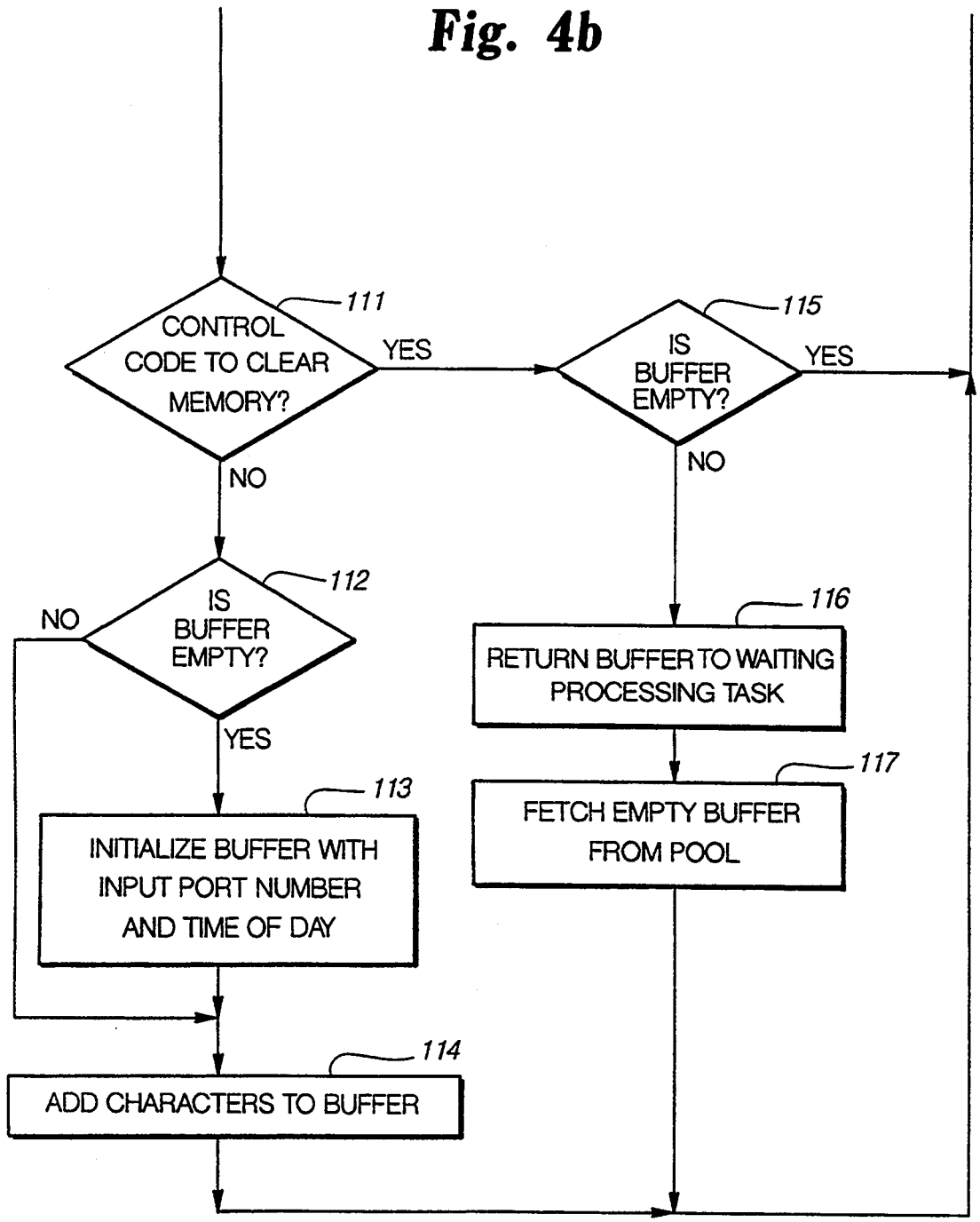
Figure 5:
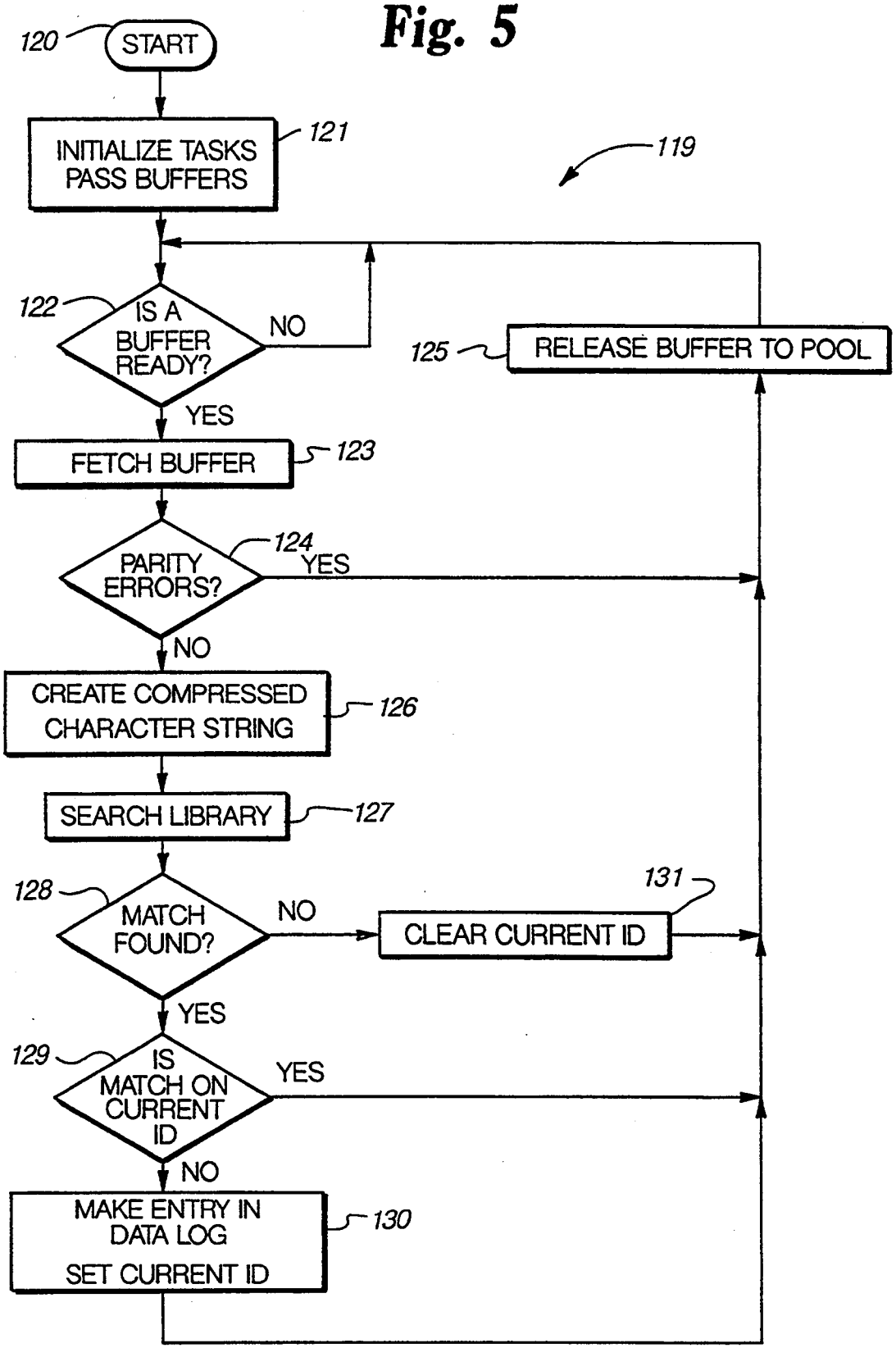
FIG. 5 is a flow chart for the software that seeks a match for a paragraph of received caption data in the caption library.

The data can be read from the shift registers U15 and U16, one 8 bit character at a time by controlling the chip enable signal lines EN1 and EN2 connected respectively to pin 13 of U15 and U16 as shown in FIG. 3b. The falling edge of the signal DR can be used to generate an interrupt on each port of the interface board. On each occurrence of an interrupt, microprocessor 19 reads the characters from the shift registers U15, U16 associated with the interrupt-generating port and stores the characters as data in a buffer in memory. Further processing of the data is controlled by firmware in the PMU as shown in FIGS. 4 and 5.

It is to be understood that the closed captioning information channel supports a caption mode and a text mode in both a primary and a secondary language. The caption mode text is recorded on a video tape along with the commercial and is automatically broadcast when the tape is played. When present, the text mode is generated and transmitted by the broadcaster when the channel is not being used to carry caption mode data. The caption and text modes in both languages are time multiplexed into the one serial character channel. Control code characters are used to switch the character stream between caption mode and text mode and between the two languages.

The microprocessor 19 must separate the caption mode characters from the remainder of the character stream. The characters in the closed captioning text are organized into phrases and sentences complete with punctuation and control codes. In caption mode, the control codes perform operations such as erasing the displayed captions, selecting the line on which the captions are to be displayed, setting colors for the characters, and controlling scrolling of the captions on the television set. For the purposes of this system, the caption text can be considered to be a series of paragraphs where a paragraph is the series of characters between two successive commands to clear the captions from the screen. The characters in a paragraph can be organized into phrases and sentences.

The command to erase displayed captions occurs relatively frequently; typically at any significant scene change. Every commercial begins and ends with a command to erase the displayed captions. Therefore, a commercial can include one or more paragraphs of caption text. Microprocessor 19 recognizes commercials by extracting the caption mode text from the continuing character stream, organizing this text into sensed paragraphs and then comparing each sensed paragraph to a library of stored paragraphs for the commercials that the system has been trained to recognize. Each stored paragraph in the library preferably has a corresponding commercial ID number.

In one embodiment, sensed paragraphs are compared directly to stored paragraphs. In an alternative embodiment, the caption mode paragraphs are compressed by a data compression algorithm. The data compression algorithm processes the variable length string of ASCII characters that comprise the paragraph and produces a shorter and preferably unique string or key of encoded bytes. A number of algorithms are known to those skilled in the art; a preferred data compression algorithm is Adaptive Lempel-Ziv Coding, which may be found in an article by Terry Welch entitled "A Technique For High Performance Data Compression," pp. 8–19 of Vol. 7, No. 6, of *IEEE Computer*, June 1984. One alternative algorithm or technique which may be used is Huffman Encoding, which may be found in an article by Jonathan Amsterdam entitled "Data Compression with Huffman Coding," pp. 99–108 of Vol. 11, No. 5 of BYTE Magazine, May, 1986. A still further alternative is to use hash coding to form a key for data "compression." While a hash code key is irreversible in the sense that the original data cannot be recovered from the key, reversibility is not necessary for the practice of this invention. It is theoretically most desirable to have a one-to-one and only one-to-one correspondence between the original data and the key resulting from operation of the data compression algorithm on the original data. In other words, it is preferable to have one and only one set of original data correspond to a given key. Nevertheless, it is to be understood to be within the spirit and scope of this invention to use an algorithm having a less than ideal data-key correspondence, which, for example, can provide savings in operating speed, storage requirements or other practical considerations that outweigh the risk of error in using such an "imperfect" data compression algorithm.

Returning to a preferred embodiment, both sensed and stored paragraphs are processed by a data compression using adaptive Lempel-Ziv Coding to produce a unique multi-byte key. These keys can be stored in the library instead of the complete paragraph itself. The library in this case would include the multi-byte keys, each with a corresponding commercial ID number. When the system is identifying commercials, the sensed paragraphs (derived from the broadcast sources) are each put through the same algorithm or transform to produce a key which is then compared to the keys in the library.

FIG. 4 is a flow chart for the operation that performs the task of reading the characters into the microprocessor 19 and then forming the characters into paragraphs of caption mode text. This module is started by a higher level task and once started will continue to operate as an independent, interrupt driven task until cancelled by the task that initiated it. When the task is started at entry step 101 it acquires a pool of empty data buffers which are used to assemble the paragraphs and to transfer the completed paragraphs to the higher level task. At step 102 the module 100 initializes itself, fetches an empty data buffer (the "active" buffer) from the pool, and defaults to a caption mode active condition. It then proceeds to step 103 where it enters a suspended condition, waiting for an interrupt. When an interrupt occurs, the task proceeds to step 104 and reads the two characters from the signal processing module 8. At step 105, a test is made to determine if the secondary language bit is set; and if it is the characters are ignored and control returns to step 103 to wait for the next pair of characters. If the characters are in the primary language, the process proceeds to step 106 where a test is made to determine if the caption mode is active. If it is not active then the characters are text mode data that can be ignored and control is returned to step 103 to wait for the next two characters. However, the return to step 103 is made via step 107 where a test is made to determine if the characters received are the control characters that switch the character stream into caption mode. If this is true, then at step 108 the caption mode is set active. If the caption mode is active at step 106, step 109 then tests the received characters to determine if they are the control characters that switch the character stream into text mode, i.e., to set caption mode not active. If so, control again returns to step 103 after setting the caption mode not active at step 110. Control will proceed to step 111 only when caption mode characters are being received. Step 111 tests to determine if the characters received include the control codes to clear memory. If not, then these characters form part of the current paragraph and are added to the active buffer. However, before adding the characters to the active buffer, step 112 tests to determine if these characters are the first characters in this paragraph; and, if they are, at step 113 the active buffer is initialized with the time of day at which the characters are received. At step 114, the characters received are added to the active buffer and control then returns to step 103 to wait for the next two characters. If the test at step 111 indicates that the control code to clear memory has been received then the contents of the active buffer represent a complete sensed paragraph. Before transferring the contents of the active buffer, i.e., the sensed paragraph, to the higher level task, a test is made at step 115 to determine if the active buffer is empty, since it is possible that the character stream may contain sequential clear commands and it is preferable to avoid transfer of empty active buffers to the higher level task. If the active buffer is not empty, then at step 116 the active buffer containing the paragraph just received is transferred to the higher level task.

FIG. 5 is a flow chart for the algorithm or task 119 that is used to compare the sensed paragraphs to the library of stored paragraphs. Task 119 processes the data buffers that are filled by and transferred from the module or task 100. Task 119 processes the data buffers and releases them faster than task 100 can fill and transfer buffers to avoid build-up of a long data buffer queue.

Task 119 starts at step 120. At step 121, the task initializes itself, creates and passes a pool of data buffers to task 100, and then transfers control to task 100 at step 101. At step 122 it monitors the pool of data buffers until one is transferred from task 100. At step 123, the task 119 fetches the oldest available buffer in the queue. At step 124, the buffer is examined for communication errors (parity checks); and if errors have occurred, the buffer is returned to the pool at step 125 and control returns to step 122. At step 126, data compression transformation is performed on the paragraph in the buffer to create a corresponding key or compressed character string. At step 127, the library is searched for a matching key and, if a match is found, the commercial ID number is returned from the matching key file in the library. If there is no match, control returns through step 125 to step 122. If a match is found, one additional test must be made before making an entry in the data log. Each commercial may include more than one closed captioning paragraph but it is desirable that the system make only one entry in the data log for each play of the commercial. Therefore, at step 129 a test is made to determine if the match is for a commercial ID that is current. If the match is not on a current commercial, at step 130 an entry is made in the data log and the current ID is set for the commercial that was just identified. Then the buffer is released at step 125 and the task returns to step 122 where it waits for a buffer to be ready. The current ID is reset at step 130 after a new commercial has been identified and cleared at step 131 whenever a match is not made on a valid paragraph.

As stated previously, at step 130 after a match is found, data is entered into a data log. Preferably, the data that is collected includes an ID number for the commercial, and the time at which it was broadcast. It is to be understood that once started, module 119 runs continuously until cancelled. Module 119 will continually process active buffers filled in module 100 and release empty buffers to the pool (for use by module 100). Although not shown, it is to be further understood that the data log created by module 119 is preferably periodically interrogated and cleared.

One of the functions that the central computer 15 performs is the creation and maintenance of the library Of stored paragraphs, or data compression keys and commercial ID numbers. In FIG. 1, a VCR 46 is preferably located at or near central computer 15. The purpose of the VCR 46 is to generate (from video tape) the caption mode paragraphs for the commercials that the PMUs 8 are to recognize. The composite output of the VCR is directed to a demodulator—decoder module 48, the output of which is input to the computer 15. An operator enters the caption mode text for a commercial into the library by playing a taped copy of the commercial on the VCR while running a special program on the computer 15. This program is called the library input program.

Figure 6:
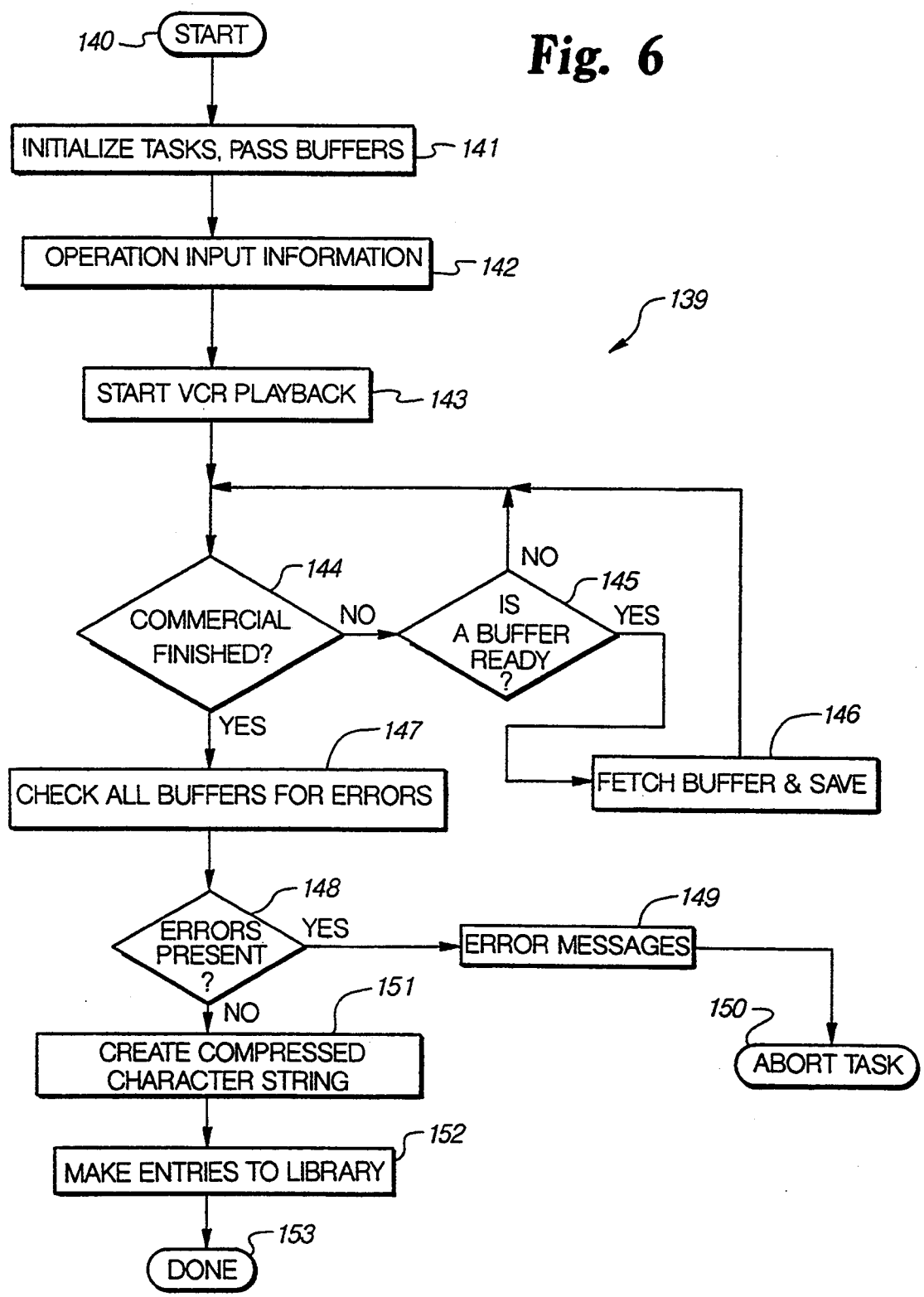
FIG. 6 is a flow chart for the steps required to make an entry to the caption library.
Figure 7:
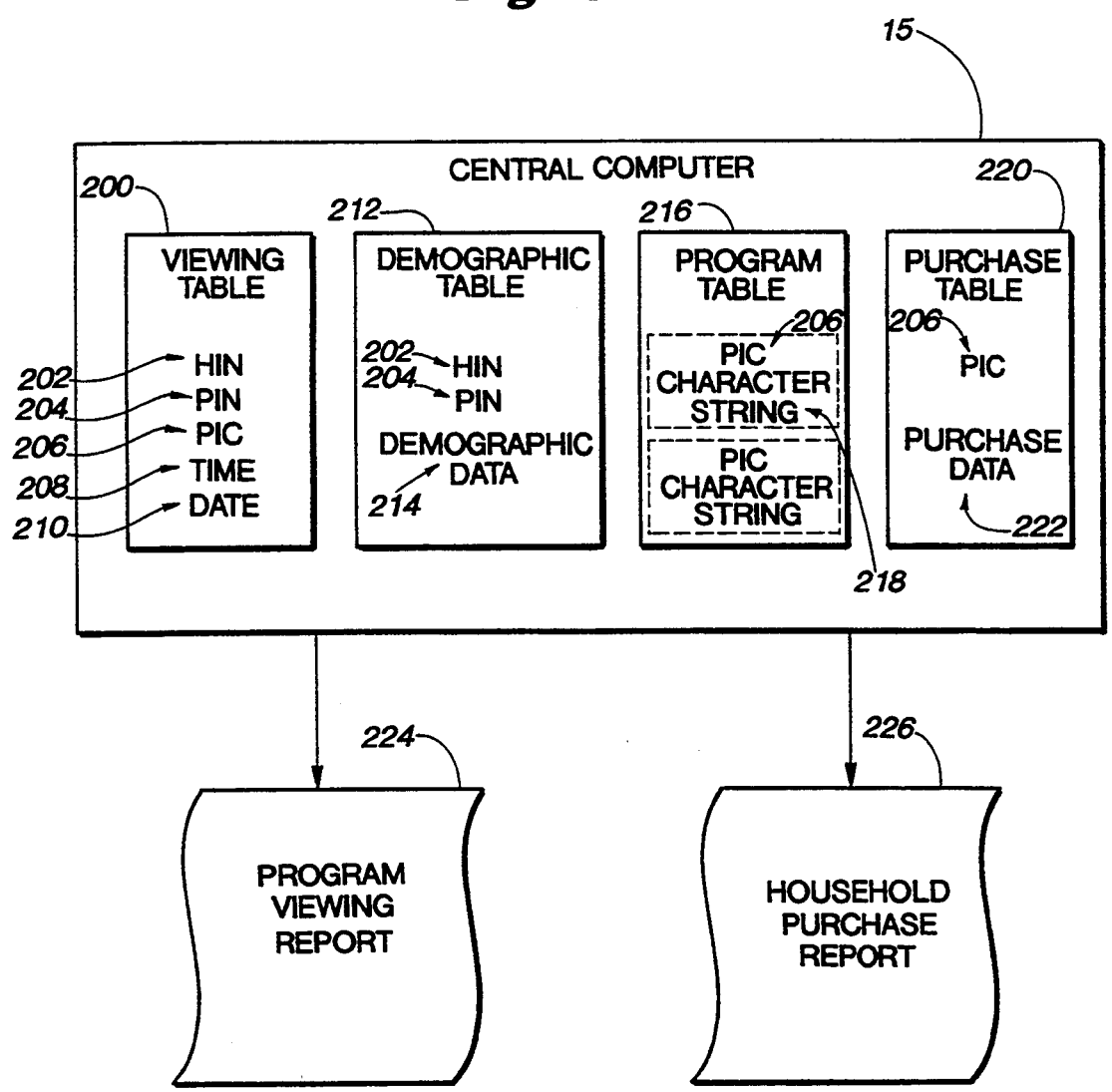
FIG. 7 is a block diagram of tables contained in and reports generated by the central computer of the system.

The algorithm or task 139 for the library input program is shown in FIG. 6. Task 139 starts at step 140. At step 141 task 139 initializes itself and starts the low level task 100 which reads the characters and assembles the sensed paragraphs. This task must also maintain a pool of data buffers which are shared with the low level task 100. At step 142, the operator inputs (via a keyboard of central computer 15) the commercial ID number that is to be assigned to this commercial as well as any other information relevant to that commercial such as product category, manufacturer, agency, etc. At step 143, the operator starts VCR 46 to play the tape of a commercial to be "memorized" by computer 15. In the loop formed by steps 144, 145 and 146, task 139 accepts buffers until the tape is stopped. When the tape is stopped, the task 139 is allowed to proceed to step 147 where the paragraphs in the buffers are checked for communication errors (parity checks). If errors are detected, the task terminates at step 150 rejecting any library entry that is not perfect, preferably with a suitable error message for the operator. If there are no errors, at step 151 the task 139 performs the character string compression on each of the paragraphs. At step 152, an entry is made in the library for each of the compressed strings.

The library created at step 152 is preferably transmitted to Program Monitoring Unit 8 via telephone network 14 at an appropriate time when remote system 2 is in communication with central computer 15.

The data defining the household purchase of goods and services may be collected using the technique of consumer questionnaires. The questionnaires can be of the well-known paper diary type or the electronic diary type in which the panelist interacts with and completes the questionnaire on the household TV set 10. In such a case, the purchase data collected from each household may be transmitted via network 14 but in any event is entered into the database on the central site computer 15. It is to be understood that other methods of collecting the purchase data are contemplated, such as in-store or in-home UPC symbol scanners.

To facilitate the generation of reports, the central site computer 15 contains several tables in which the collected data is stored. The information that is retrieved from the households is stored in a viewing table 200 that contains the household indentification number 202, the panel identification number 204 (for the case where there are multiple panels such as a test and control panel) and the program identification code 206 along with the time 208 and the date 210 that the program was identified as having been viewed in the home.

A separate demographic table 212 contains the household identification number 202, panel identification number 204 along with a set of demographic data 214 associated with the household.

A program table 216 contains the character strings 218 for various programs along with their program identification codes 206 and other information associated with the program.

A purchase table 220 contains the collected purchase data 222 of goods and services associated with each household, as well as the program identification code 206 associated with the various brand categories, brand items and services. In addition, other tables may be maintained in the central computer database to facilitate the generation of various reports as desired.

One standard report that can be generated by the software in the central computer 15 is a program viewing report 224. This report specifies how many households in the panel had their television sets tuned to a predetermined program on a specific date and time or during a preselected time period. Only the data collected from the households is needed to automatically produce this report. It is not necessary to have centrally monitored all possible channels on which the program of interest could have been broadcast to be able to identify the programs viewed in the panelists house. To generate this report a computer operator merely enters the program identification code (PIC) and the desired time period into the report generating software. The software then automatically retrieves all records from the viewing table that contain the selected PIC and meet the requirement of the specified time period. The output would be a tabulation of the households that viewed the program and the number of times it was viewed by each household during the selected time period.

By using the data in the viewing table and purchase table the software can also generate a household purchase report 226 that lists all the households that have viewed a television program and purchased an associated service or product. To generate this report the operator runs a program that combines the viewing table and the purchase table using the household identification number as a key. The program then retrieves all records from the combined table that contain both the PIC and product or service selected by the operator for the time period of interest. The program then processes this data to produce a table listing the number of viewings of the commercial by each household and the quantity of associated products or services that were purchased by the household. Each of the reports described above can be generated for each panel for the case where multiple panels are being monitored. These separate reports permit the researchers to closely monitor the resulting purchase behavior of panels exposed to different amounts or types of commercials. Further reports can also be generated incorporating the households' demographic characteristics by combining the demographic table with one or more of the other tables. The manner in which the data is stored and collected permits the rapid generation of both standard and nonstandard reports by querying the database at the central site.

The invention is not to be taken as limited to all of the details thereof, as modifications and variations thereof may be made without departing from the spirit or scope of the invention; for example, a system which monitors only households that are equipped with a cable converter 6 and a cable television signal; however, it is to be understood to be within the scope of the present invention to determine the television programs being viewed on a television set equipped with an external tuner receiving a signal via a conventional antenna. As an alternative, the cable converter shown in FIG. 1 can be replaced with a VCR used to select channels from a cable television feed or a conventional antenna. As a further alternative, when the tuner in the television set is used to tune to a signal from a cable television feed or from a conventional antenna, the PMU 8 can be adapted to monitor the programming being viewed in the household. By inserting a signal tap in the television set to feed the output of the television tuner to the decoder 18 in the PMU 8.

What is claimed is:

1. A program monitoring unit for monitoring the viewing of television programs by collecting data with respect to cooperating television viewers or panelists at a remote location for later transmission to a central computer for processing, the program monitoring unit comprising:

a) comparison table storing means for storing an updatable table of character strings;

b) signal acquisition means for acquiring a television signal being viewed by the cooperating television viewer;

c) decoding means for decoding character strings from the closed captioning signal that is embedded in the viewed television signal;

d) matching means for matching decoded character strings with character strings found in the table of character strings;

e) memory means for storing the decoded character strings that match character strings found in the table of character strings;

f) modem means for periodically establishing telephone communications between the program monitoring unit and the central computer via a public switched telephone network to i) transfer the matched character strings stored in the memory means to the central computer and ii) periodically update the table of character strings stored in the comparison table storing means.

2. A program monitoring unit in accordance with claim 1 wherein the character strings stored by the program monitoring unit are stored along with the date and time at which they were decoded.

3. A program monitoring unit in accordance with claim 2 wherein each character string and the date and time at which it was decoded is transferred to the central computer to allow the central computer to determine when the television program was viewed.

4. A program monitoring unit in accordance with claim 1 wherein the television programs identified are television commercials.

5. A system for collecting data with respect to cooperating television viewers or panelists comprising:

a) a remote unit connected to a television receiver such that the remote unit is able to monitor television programs being viewed by the cooperating television viewers, the remote unit having
  i) first memory means for electronically storing an updatable table of character strings and respective associated program identification codes such that every character string has a corresponding program identification code in the table;
  ii) decoding means for decoding a character string from the closed captioning signal that is embedded in a television program being viewed;
  iii) comparing means for comparing each decoded character string to the strings stored in the table to determine when a match is found;
  iv) second memory means for storing as a data event in an event data log the program identification codes corresponding to table character strings found to match the decoded character strings;

b) a central computer;

c) communication means for periodically establishing telephone communications between the remote unit and the central computer, transferring the data events stored in the second memory means to the central computer, and for receiving updates to the updatable table of character strings; and d) associating means in the central computer for associating the data events transferred from the remote unit with the television programs viewed.

6. A system in accordance with claim 5 wherein the data events stored by the remote unit further comprise a date and time at which the comparing means matched the decoded character string with the table character string.

7. A system in accordance with claim 5 wherein the television programs identified are television commercials.

8. A method of collecting data on television viewing experience of a plurality of television viewing panelists at remote household locations comprising the steps of:
   a) monitoring a television signal being viewed by the panelists for character strings found in the closed captioning signal embedded in the television signal;
   b) matching the closed captioning character strings to character strings stored in an updatable table;
   c) recording a program identification code corresponding to the signal being viewed whenever a match is made in step b);
   d) repeating steps a), b) and c) over a predetermined time interval;
   e) periodically reporting the program identification codes recorded in step to a central computer via a telephone network; and
   f) periodically receiving updates to the character strings stored in the table from the central computer.

9. The method of claim 8 wherein the television signal being viewed comprises a television commercial.

10. The method of claim 8 wherein step c) further comprises recording a time at which the signal was viewed.

11. The method of claim 10 wherein step c) further comprises recording the date on which the signal was viewed.

12. The method of claim 11 wherein step e) further comprises reporting the time and date recorded in step c) to the central computer.

13. A system for collecting data on television viewing experience comprising:
   a) a central computer; and
   b) a plurality of remote household program monitoring units, each unit having:
      i) decoding means for decoding a character string from the closed captioning signal that is embedded in a television program currently being displayed on a television set in the household,
      ii) code storage means for storing program identification codes,
      iii) means for associating the decoded character string with one of the program identification codes;
      iv) data log means for electronically storing the program identification code that is associated with the decoded character string in step ii),
      v) modem means for:
         1) periodically establishing telephone communication between each remote program monitoring unit and the central computer and
         2) transferring the contents of the data log means from each remote unit to the central computer, and
         3) updating the program identification codes stored in the code storage means.

14. The system of claim 13 wherein each program monitoring unit further comprises a real-time clock means for identifying and recording in the data log the date and time at which a particular television program was displayed.

15. The system of claim 14 wherein the particular television program displayed comprises a television commercial.

16. The system of claim 13 wherein the central computer further comprises
   i) viewing table which contains a household identification number, a time and a date corresponding to each program identification code transferred from the data log means to the central computer; and
   ii) report generating means for generating a program viewing report of how many households had their television sets tuned to a predetermined program.

17. The system of claim 16 wherein the viewing table further comprises a panel identification number for identifying a panel to which each respective household belongs.

18. The system of claim 16 wherein the central computer further comprises
   iii) a demographic table comprising a set of demographic data for each respective household, and further wherein the report generating means utilizes said demographic data in said program viewing report.

* * * * *

UNITED STATES PATENT AND TRADEMARK OFFICE
CERTIFICATE OF CORRECTION

PATENT NO. : 5,374,951

DATED : December 20, 1994

INVENTOR(S) : Russell J. Welsh, Toronto, Canada

It is certified that error appears in the above-identified patent and that said Letters Patent is hereby corrected as shown below:

In Col. 6, Line 49, the word "PUMs" should be --PMUs--.

In Col. 8, Line 39, the word "USA" should be --U8A--.

In Col. 8, Line 64, "4S" should be --45--.

In Col. 13, Line 45, the word "Of" should be --of--.

Signed and Sealed this

Twenty-seventh Day of June, 1995

Attest:

BRUCE LEHMAN

Attesting Officer

Commissioner of Patents and Trademarks